United States Patent
Den et al.

(10) Patent No.: US 7,453,193 B2
(45) Date of Patent: Nov. 18, 2008

(54) ELECTRONIC DEVICE CONTAINING A CARBON NANOTUBE

(75) Inventors: Tohru Den, Tokyo (JP); Tatsuya Iwasaki, Atsugi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/556,254

(22) Filed: Nov. 3, 2006

(65) Prior Publication Data

US 2007/0205707 A1 Sep. 6, 2007

Related U.S. Application Data

(62) Division of application No. 11/250,454, filed on Oct. 17, 2005, now Pat. No. 7,148,619, which is a division of application No. 10/712,101, filed on Nov. 14, 2003, now Pat. No. 6,979,244, which is a division of application No. 10/435,536, filed on May 12, 2003, now Pat. No. 6,720,728, which is a division of application No. 09/178,680, filed on Oct. 26, 1998, now Pat. No. 6,628,053.

(30) Foreign Application Priority Data

| Oct. 30, 1997 | (JP) | 1997/298373 |
| Sep. 14, 1998 | (JP) | 1998/276426 |

(51) Int. Cl.
    *H01J 1/30* (2006.01)
(52) U.S. Cl. .......... 313/309; 313/495; 313/310
(58) Field of Classification Search ............ 313/309, 313/336, 351, 310, 495–497
    See application file for complete search history.

(56) References Cited

U.S. PATENT DOCUMENTS

| 5,773,834 A | * | 6/1998 | Yamamoto et al. ....... 250/423 F |
| 5,773,921 A | | 6/1998 | Keesmann et al. .......... 313/309 |
| 5,916,642 A | * | 6/1999 | Chang .................... 29/509 |
| 5,973,444 A | | 10/1999 | Xu et al. ................ 313/309 |
| 6,097,138 A | | 8/2000 | Nakamoto ............... 313/309 |
| 6,346,189 B1 | | 2/2002 | Dai et al. ................ 205/766 |
| 6,445,006 B1 | | 9/2002 | Brandes et al. ............ 257/76 |
| 6,672,925 B2 | | 1/2004 | Talin et al. .............. 445/49 |
| 6,689,674 B2 | | 2/2004 | Zhang et al. ............. 438/584 |

FOREIGN PATENT DOCUMENTS

| EP | 0 758 028 A2 | 2/1997 |
| JP | 06310976 | * 4/1994 |

(Continued)

OTHER PUBLICATIONS

Measurements of the conductivity of individual 10 nm carbon nanotubes Whitesides, George M; Weisbecker, Carl S Novel forms of carbon II; Proceedings of the Symposium, San Francisco, CA; United States; Apr. 4-8, 1994. pp. 263-268. 1994.*

(Continued)

*Primary Examiner*—Joseph L Williams
(74) *Attorney, Agent, or Firm*—Fitzpatrick, Cella, Harper & Scinto

(57) ABSTRACT

An electronic device in which a substrate with a pair of electrodes is provided and a carbon nanotube is formed or arranged in relation to the electrodes.

1 Claim, 12 Drawing Sheets

FOREIGN PATENT DOCUMENTS

| | | |
|---|---|---|
| JP | 8-115652 | 5/1996 |
| JP | 2003-227808 | 8/2003 |
| WO | WO 89/07163 | 8/1989 |
| WO | WO 90/07023 | 6/1990 |
| WO | WO 98/05920 | 2/1998 |
| WO | WO 02/063693 A1 | 8/2002 |

OTHER PUBLICATIONS

Nature 386, 474-477 (Apr. 3, 1997); doi:10.1038/386474a0 Individual single-wall carbon nanotubes as quantum wires Sander J. Trans, Michel H. Devoret†, Hongjie Dai‡, Andreas Thess‡, Richard E. Smalley‡, L. J. Geerligs & Cees Dekker.*

R.T.K. Baker, "Catalytic Growth of Carbon Filaments," 27(3) *Carbon* 315-23 (1989).

R.T.K. Baker et al., "Formation of Carbonaceous Deposits from the Platinum-Iron Catalyzed Decomposition of Acetylene," 37 *J. Catal.* 101-05 (1975).

S. Iijima, "Helical Microtubules of Graphic Carbon," 354 *Nature* 56-58 (Nov. 1991).

T.W. Ebbesen et al., "Large-Scale Synthesis of Carbon Nanotubes," 358 *Nature* 220-22 (Jul. 1992).

W.A. deHeer et al., "Aligned Carbon Nanotube Films: Production and Optical and Electronic Properties," 268 *Science* 845-847 (May 1995).

T. Guo et al., "Catalytic Growth of Single-Walled Nanotubes by Laser Vaporization," 243 *Chem. Phys. Lett.* 49-54 (Sep. 1995).

A.G. Rinzler et al., "Unraveling Nanotubes: Field Emission from an Atomic Wire," 269 *Science* 1550-53 (Sep. 1995).

W.A. deHeer et al., "A Carbon Nanotube Field-Emission Electron Source," 270 *Science* 1179-80 (Nov. 1995).

A. Thess et al., "Crystalline Ropes of Metallic Carbon Nanotubes," 273 *Science* 483-87 (Jul. 1996).

H. Dai et al., "Single-Wall Nanotubes Produced by Metal-Catalyzed Disproportionation of Carbon Monoxide," 260 *Chem. Phys. Lett.* 471-475 (Sep. 1996).

H. Dai et al., "Nanotubes as Nanoprobes in Scanning Probe Microscopy," 384 *Nature* 147-50 (Nov. 1996).

A.C. Dillon et al., "Storage of Hydrogen in Single-Walled Carbon Nanotubes," 386 *Nature* 377-79 (Mar. 1997).

Takashi Kyotani et al., "Preparation of Ultrafine Carbon Tubes in Nanochannels of an Anodic Aluminum Oxide Film," 8 *Chem. Mater.* 2109-13 (1996).

* cited by examiner

ELECTRONIC DEVICE CONTAINING A CARBON NANOTUBE

This application is a division of application Ser. No. 11/250,454, filed Oct. 17, 2005, which is a division of application Ser. No. 10/712,101, filed Nov. 14, 2003, now U.S. Pat. No. 6,979,244, which is a division of U.S. application Ser. No. 10/435,536, filed May 12, 2003, now U.S. Pat. No. 6,720,728, which is a division of U.S. application Ser. No. 09/178,680, filed Oct. 26, 1998, now U.S. Pat. No. 6,628,053. All prior applications are incorporated herein by reference.

BACKGROUND OF THE INVENTION

1. Field of the Invention

The present invention relates to a carbon nanotube device using a carbon nanotube and a manufacturing method thereof. More particularly, the invention relates to a carbon nanotube device applicable to a functional device such as a quantum-effect device, an electronic device, a micro-machine device or a bio-device etc. Further, the invention relates to a carbon nanotube device applicable to an electron source, an STM (scanning type tunnel microscope) probe, or an ATM (atomic force microscope) probe by the utilization of sharpness of the carbon nanotube, and a manufacturing method thereof.

The invention relates also to an electron emitting device for a display, a cathode ray tube, an emitter, a lamp or an electronic gun.

2. Description of the Related Art

Fibrous carbon is generally called carbon fiber, and for carbon fiber that is used as a structural material having a diameter of at least several μm, several manufacturing methods have been studied. Among those studied, a method for manufacturing the carbon fiber from a PAN (polyacrylonitrile)-based fiber or a pitch-based fiber is considered to be a mainstream method.

Schematically, this method comprises making a raw material spun from a PAN fiber, an isotropic pitch or a meso-phase pitch non-meltable and hardly flammable, carbonizing the resultant material at a temperature within a range of from 800 to 1,400° C., and treating the resultant product at a high temperature within a range of from 1,500 to 3,000° C. The carbon fiber thus obtained is excellent in mechanical properties such as strength and modulus of elasticity, and for its light weight that can be used for a sporting good, an adiabatic material and a structural material for space or automotive purposes in the form of a composite material.

On the other hand, a carbon nanotube has recently been discovered having a tubular structure whose diameter is 1 μm or less. An ideal structure of the carbon nanotube is a tube formed with a sheet of carbon hexagonal meshes arranged in parallel with its tube axis. A plurality of such tubes forms a nanotube. The carbon nanotube is expected to have characteristics like metals or semiconductors, depending upon both diameter of the carbon nanotube and the bonding form of the carbon hexagonal mesh sheet. Therefore, the carbon nanotube is expected to be a functional material in the future.

Generally, carbon nanotubes are synthesized by the application of the arc discharge process, a laser evaporation process, a pyrolysis process and the use of plasma.

(Carbon Nanotube)

An outline of a recently developed carbon nanotube will now be described.

A material having a diameter of up to 1 μm, smaller than that of carbon fiber, is popularly known as a carbon nanotube to discriminate from carbon fiber, although there is no definite boundary between them. In a narrower sense of the words, a material having the carbon hexagonal mesh sheet of carbon substantially in parallel with the axis is called a carbon nanotube, and one with amorphous carbon surrounding a carbon nanotube is also included within the category of carbon nanotube.

The carbon nanotube in the narrower definition is further classified into one with a single hexagonal mesh tube called a single-walled nanotube (abbreviated as "SWNT"), and one comprising a tube of a plurality of layers of hexagonal meshes called a multiwalled nanotube (abbreviated as "MWNT").

Which of these types of carbon nanotube structures is available is determined to some extent by the method of synthesis and other conditions. It is however not as yet possible to produce carbon nanotubes of the same structure.

These structures of a carbon nanotube are briefly illustrated in FIGS. 1A to 4B. FIGS. 1A, 2A, 3A and 4A are schematic longitudinal sectional views of a carbon nanotube and carbon fiber, and FIGS. 1B, 2B, 3B and 4B are schematic sectional views illustrating transverse sections thereof.

The carbon fiber has a shape as shown in FIGS. 1A and 1B in which the diameter is large and a cylindrical mesh structure in parallel with its axis has not grown. In the gas-phase pyrolysis method using a catalyst, a tubular mesh structure is observed in parallel with the axis near the tube center as shown in FIGS. 2A and 2B, with carbon of irregular structures adhering to the surrounding portions in many cases.

Application of the arc discharge process or the like gives an MWNT in which a tubular mesh structure in parallel with its axis grows at the center as shown in FIGS. 3A and 3B, with a slight amount of amorphous carbon adhering to surrounding portions. The arc discharge process and the laser deposition process tend to give an SWNT in which a tubular mesh structure grows as shown in FIGS. 4A and 4B.

The following three processes are now popularly used for the manufacture of the aforementioned carbon nanotube: a process similar to the gas-phase growth process for carbon fiber, the arc discharge process and the laser evaporation process. Apart from these three processes, the plasma synthesizing process and the solid-phase reaction process are known.

These three representative processes will now be described:

(1) Pyrolysis Process Using Catalyst

This process is substantially identical with the carbon fiber gas-phase growth process. The process is described in C. E Snyders et al., International Patent No. WO89/07163 (International Publication Number). The disclosed process comprises the steps of introducing ethylene or propane with hydrogen into a reactor, and simultaneously introducing super-fine metal particles. Apart from these raw material gases, a saturated hydrocarbon such as methane, ethane, propane, butane, hexane, or cyclohexane, and an unsaturated hydrocarbon such as ethylene, propylene, benzene or toluene, acetone, methanol or carbon monoxide, containing oxygen, may be used as a raw material.

The ratio of the raw material gas to hydrogen should preferably be within a range of from 1:20 to 20:1. A catalyst of Fe or a mixture of Fe and Mo, Cr, Ce or Mn is recommended, and a process of attaching such a catalyst onto fumed alumina is proposed.

The reactor should preferably be at a temperature within a range of from 550 to 850° C. The gas flow rate should preferably be 100 sccm per inch diameter for hydrogen and about 200 sccm for the raw material gas containing carbon. A carbon tube is generated in a period of time within a range of from 30 minutes to an hour after introduction of fine particles.

The resultant carbon tube has a diameter of about 3.5 to 75 nm and a length of from 5 to even 1,000 times as long as the diameter. The carbon mesh structure is in parallel with the tube axis, with a slight amount of pyrolysis carbon adhering to the outside of the tube.

H. Dai et al. (Chemical Physico Letters 260, 1996, p. 471-475) report that, although at a low generating efficiency, an SWNT is generated by using Mo as a catalytic nucleus and carbon monoxide gas as a raw material gas, and causing a reaction at 1,200° C.

(2) Arc Discharge Process

The arc discharge process was first discovered by Iijima, and details are described in Nature (vol. 354, 1991, p. 56-58). The arc discharge process is a simple process of carrying out DC arc discharge by the use of carbon rod electrodes in an argon atmosphere at 100 Torr. A carbon nanotube grows with carbon fine particles of 5 to 20 nm on a part of the surface of the negative electrode. This carbon tube has a diameter of from 4 to 30 nm and a length of about 1 μm, and has a layered structure in which 2 to 50 tubular carbon meshes are laminated. The carbon mesh structure is spirally formed in parallel with the axis.

The pitch of the spiral differs for each tube and for each layer in the tube, and the inter-layer distance in the case of a multi-layer tube is 0.34 nm, which substantially agrees with the inter-layer distance of graphite. The leading end of the tube is closed by a carbon network.

T. W. Ebbesen et al. describe conditions for generating carbon nanotubes in a large quantity by the arc discharge process in Nature (vol. 358, 1992, p. 220-222). A carbon rod having a diameter of 9 mm is used as a cathode and a carbon rod having a diameter of 6 nm, as an anode. These electrodes are provided opposite to each other with a distance of 1 mm in between in a chamber. An arc discharge of about 18 V and 100 A is produced in a helium atmosphere at about 500 Torr.

At 500 Torr or under, the ratio of the carbon nanotubes is rather low, and at over 500 Torr, the quantity of generation decreases as a whole. At 500 Torr which is the optimum condition, the ratio of carbon nanotubes reaches 75%.

The collection ratio of carbon nanotubes is reduced by causing a change in supplied power or changing the atmosphere to argon one. More nanotubes are present near the center of the carbon rod.

(3) Laser Evaporation Process

The laser evaporation process was first reported by T. Guo et al. in Chemical Physics Letters (243, 1995, p. 49-54), and further, generation of a rope-shaped SWNT by the laser evaporation process is reported by A. Thess et al. in Science (vol. 273, 1996, p. 483-487).

First, a carbon rod formed by dispersing Co or Ni is placed in a quartz tube, and after filling the quartz tube with Ar at 500 Torr, the entire combination is heated to about 1,200° C. Nd-YAG laser is condensed from the upstream end of the quartz tube to heat and evaporate the carbon rod. Carbon nanotubes are thus accumulated in the downstream end of the quartz tube. This process is hopeful for selective preparation of SWNTs, and has a feature that SWNTs tend to gather to form a rope shape.

The conventional art will now be described in terms of application of the carbon nanotube.

(Application of Carbon Nanotube)

While no applied product of carbon nanotube is available at present, active research efforts are being made for its applications. Typical examples of such efforts will be briefly described.

(1) Electron Emission Source

The carbon nanotube, having a shape leading end and being electrically conductive, is adopted in many research subjects.

W. A. De Heer et al. refined a carbon nanotube obtained by the application of the arc discharge process, and placed it upright on a support via a filter to use it as an electron source (Science, vol. 270, 1995, p. 1179). They report that the electron source comprised a collection of carbon nanotubes, and an emission current of at least 100 mA was stably obtained by the impression of 700 V from an area of 1 $cm^2$.

A. G. Rinzler et al. evaluated properties by attaching an electrode to a carbon nanotube obtained by the arc discharge process, and there was available an emission current of about 1 nA from a carbon nanotube with a closed end, and of about 0.5 μA from a carbon nanotube with an open end, by the impression of about 75 V (Science, vol. 269, 1995, p. 1550).

(2) STM, AFM

H. Dai et al. report, in Nature (384, 1996, p. 147), an application of a carbon nanotube to STM and AFM. According to their report, the carbon nanotube prepared by the arc discharge process was an SWNT having a diameter of about 5 nm at the leading end. Because of a thin tip and flexibility, even the bottom of a gap of a sample could be observed, and there was available an ideal tip free from a tip crash.

(3) Hydrogen Storing Material

A. C. Dillon et al. report, in Nature (vol. 386, 1997, p. 377-379), that the use of an SWNT permits storage of hydrogen molecules of a quantity several times as large as that available with a carbon generated from a pitch-based raw material. While their study on application has just begun, it is expected to serve as a hydrogen storing material for a hydrogen car or the like.

In the configuration and manufacturing method of a carbon nanotube in the conventional art, diameters and directions of resultant carbon nanotubes are very random, and after growth, an electrode is not connected to the carbon nanotube. More specifically, upon application of the carbon nanotube, it is necessary to collect after synthesis for purifying, and form it into a particular shape in compliance with the shape for application.

For example, when it is to be used as an election source, A. G. Rinzler et al. teaches the necessity to take out a carbon fiber and to bond an end thereof to an electrode, as reported in Science (vol. 269, 1995, p 1550-1553).

Further, as reported in Science (vol. 270, 1995, p 1179-1180) and Science (vol. 1, 268, 1995, p. 845-847), Walt A. de Heer et al. discloses the necessity to provide a step of purifying a carbon nanotube prepared by the arc discharge process, and then placing upright the carbon nanotube on a support by the use of a ceramic filter. In this case, an electrode is not positively bonded to the carbon nanotube. Further, the carbon nanotubes in application tend to get entangled with each other in a complicated manner, and it is difficult to obtain devices fully utilizing characteristics of the individual carbon nanotubes.

SUMMARY OF THE INVENTION

The present invention was developed in view of the problems as described above, and has an object to provide a carbon nanotube device, in which a carbon nanotube has a strong directivity, giving a large quantity of electron emission when it is used, for example, as an electron emission device.

Another object of the invention is to provide a manufacturing method of carbon nanotube device in which the carbon nanotube binds to a conductive surface so that conduction is maintained therebetween, and the carbon nanotube has a high directivity.

Further, the invention has an object to provide an electron emission device giving a large quantity of electron emission and having a high performance.

Specifically, there is provided a carbon nanotube device comprising a support having a conductive surface and a carbon nanotube, one of whose terminus binds to said conductive surface at a site so that conduction between said conductive surface and said carbon nanotube is maintained, wherein a root of said carbon nanotube where said carbon nanotube binds to said conductive surface is surrounded by a wall.

Forming the barrier with a layer containing alumina or silicon is preferable with a view to achieving a higher density of the carbon nanotubes binding to the conductive surface. The wall containing alumina is available, after forming an aluminum thin film on the conductive surface, for example, by anodically oxidizing aluminum. At this point, the conductive surface should preferably comprise a layer containing at least one element selected from the group consisting of titanium, zirconium, niobium, tantalum, molybdenum, copper and zinc. It is not necessary that the conductive surface be previously protected even during anodic oxidation of the aluminum thin film.

There is also provided, a manufacturing method of a carbon nanotube device comprising a support having a conductive surface and a carbon nanotube, one of whose terminus binds to said conductive surface at a site so that conduction between said conductive surface and said carbon nanotube is maintained, wherein a root of said carbon nanotube at the site where said carbon nanotube binds to said conductive surface is surrounded by a wall, said method comprising the steps of:

(i) forming a plurality of carbon nanotube binding sites isolated from each other by walls on said conductive surface; and (ii) forming carbon nanotubes at the sites.

Additionally, there is provided an electron emitting device comprising:

a carbon nanotube device, which itself comprises a support having a conductive surface and a carbon nanotube, one of whose terminus binds to said conductive surface so that conduction between said conductive surface and said carbon nanotube is maintained, wherein a root of said carbon nanotube where said carbon nanotube binds to said conductive surface is surrounded by a wall;

an electrode located at a position opposite to said conductive surface; and means for impressing a potential to a space between said conductive surface and said electrode.

According to the invention as described above, it is possible to control growth direction of the carbon nanotube by means of the wall. As a result, it is possible to provide an electron emitting device having excellent electron emitting properties, and a carbon nanotube device suitable for a probe of an STM or an AFM which gives a satisfactory image and has a high strength.

In the case where the wall comprises a layer containing alumina or silicon, it is possible to efficiently form a carbon nanotube device having a configuration in which a plurality of carbon nanotubes bind to the conductive surface, and binding sites of the individual carbon nanotubes are isolated from each other by the wall. The device of the invention, provided with carbon nanotubes whose growth directions are almost the same, and each of which have a uniform directivity isolated from each other at a high density, is suitably applicable for an electron emitting device or a probe such as an STM or an AFM.

When the conductive surface comprises a layer containing at least one material selected from the group consisting of titanium, zirconium, niobium, tantalum, molybdenum, copper and zinc, it is possible to easily form a carbon nanotube of the invention. More specifically, an alumina thin film having a narrow hole is formed through anodic oxidation also when forming the barrier by anodic oxidation of an aluminum thin film. The anodic oxidation carried out so that the bottom of the narrow hole serves as the electrode surface never damages the conductive surface, and as a result, it is possible to easily form a carbon nanotube binding conductively to the conductive surface.

In the various features of the present invention as described above, the expression "a terminus of the carbon nanotube binds conductively to the conductive surface of the support" includes in addition to the embodiment in which the carbon nanotube binds directly to the conductive surface, an embodiment in which the carbon nanotube is conductively connected to the conductive surface under a tunnel effect via an insulating layer, and an embodiment in which the carbon nanotube binds conductively to the conductive surface through an insulating layer including a path containing an element composing the conductive surface.

BRIEF DESCRIPTION OF THE DRAWINGS

FIGS. 1A to 4B are schematic views illustrating various structures of a carbon nanotube: FIGS. 1A and 1B respectively illustrate schematic longitudinal and transverse sectional views of an isotropic carbon fiber;

FIGS. 4A and 4B respectively illustrate schematic longitudinal and transverse sectional views of a single-walled nanotube;

FIG. 5A is an example of a configuration with a different support, conductive surface layer and wall; FIG. 5B is a configuration in which a support and a layer forming a conductive surface form a single body; FIG. 5C is a configuration in which a layer composing a conductive surface and a wall form a single body; and FIG. 5D is a configuration in which a support, a layer comprising a conductive surface and a wall form a single body;

FIG. 6A is a configuration in which a support, a layer composing a conductive surface, an insulating layer and a wall are different; FIG. 6B is a configuration in which an insulating layer is present on the surface of a wall; FIG. 6C is a configuration in which an insulating layer is present on a part of the surface of a layer composing a conductive surface; and FIG. 6D is a configuration in which a support, a layer composing a conductive surface, and a wall form a single body;

DESCRIPTION OF THE PREFERRED EMBODIMENTS

Figure 1A:
Figure 1B:
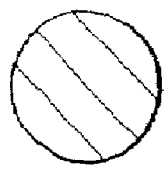

FIGS. 5A to 5D and FIGS. 6A to 6D are schematic sectional views of embodiments of the carbon nanotube devices of the present invention. In the invention, the term "carbon nanotube" means a structure at least partially having a cylindrical structure mainly comprising carbon, in which, particularly the cylindrical portion has a diameter of up to 1 μm.

Referring to FIGS. 5A to 5D and 6A to 6D, 20 is a support; 21 is a layer comprising a conductive surface of the support 20; 24 is a carbon nanotube conductively binding to the conductive surface 21; 23 is a catalytic super-fine particle present between the carbon nanotube and the conductive surface 21; and 22 is a wall surrounding the root 24A of the carbon nanotube 24 to the conductive surface 21.

The layer comprising the conductive surface 21 of the support is formed on the support 20. The carbon nanotube 24 binds via the catalytic super-fine particle 23 to the surface of the layer composing the conductive surface 21. The root 24A of the carbon nanotube 24 where the carbon nanotube 24 binds to the conductive surface 21 at a binding site, is surrounded by the wall 22.

Figure 5A:
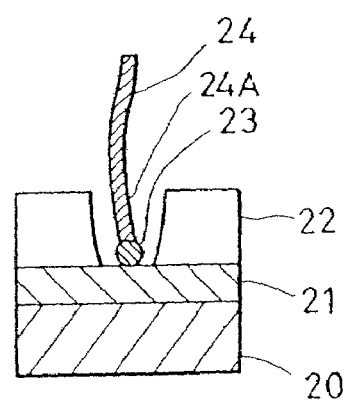
FIG. 5A to 5D cover schematic conceptual views illustrating configurations of carbon nanotube devices.
Figure 5B:
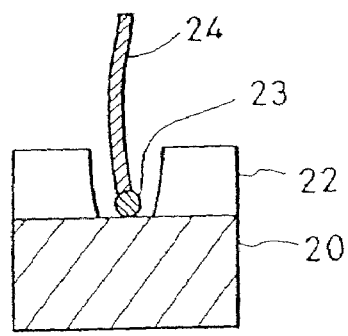
Figure 5C:
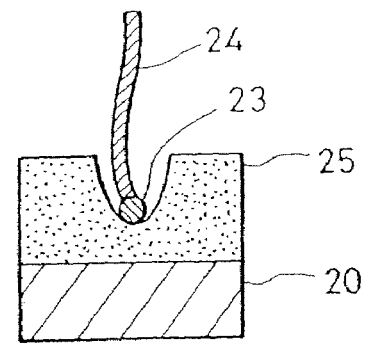
Figure 5D:
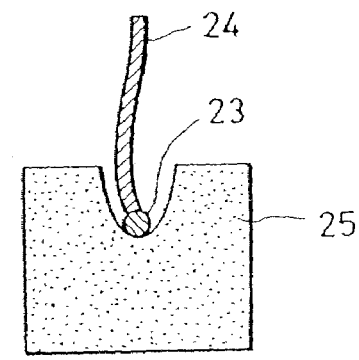

The support 20 itself has a conductive surface 21, and the carbon nanotube 24 binds via the catalytic super-fine particle 23 to this conductive surface 21. The root of the carbon nanotube 24 is surrounded by the wall 22. FIG. 5C is an embodiment in which the wall 22 and the conductive surface 21 comprise a semiconductor wall 25, and FIG. 5D is an embodiment in which the support 20 having the conductive surface 21 and the wall 22 comprise a semiconductor wall 25.

In the aforementioned example, electrical junction between the carbon nanotube 24 and the conductive surface 21 may be in the form of an ohmic junction ensuring a sufficient connection, or of a Schottky junction. The junction property varies with the composition of the catalyst, and the layer composing the conductive surface 21 and manufacturing conditions thereof.

FIGS. 6A to 6D illustrate an embodiment in which the carbon nanotube 24 conductively binds to the conductive surface 21 by tunnel junction, and the root is surrounded by the wall 22.

Figure 6A:
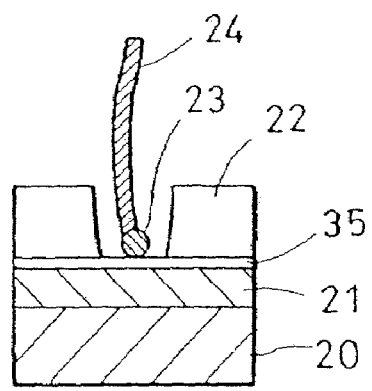
FIGS. 6A to 6D are schematic conceptual views illustrating configurations of tunnel junction type carbon nanotube devices.
Figure 6B:
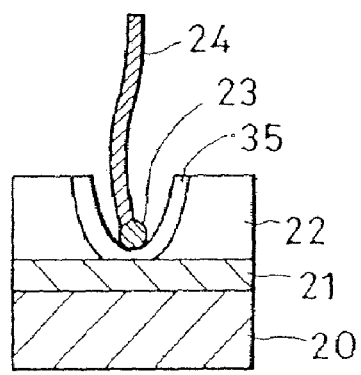
Figure 6C:
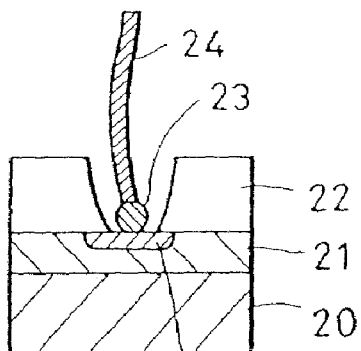
Figure 6D:
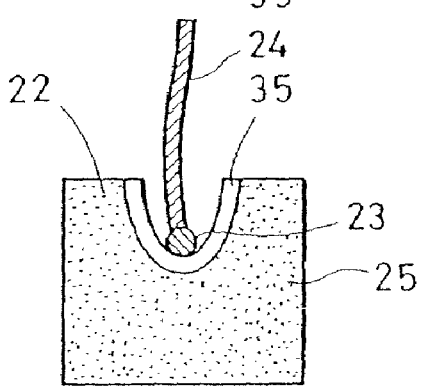

FIG. 6A illustrates an embodiment in which an insulating layer 35 such as a surface oxide layer is on the layer composing the conductive surface 21 of the support, the catalytic super-fine particle 23 being provided thereon, and the carbon nanotube 24 grows from the catalytic super-fine particle 23. FIG. 6B illustrates an embodiment in which an insulating layer 35 is formed also on the side surface of the wall surrounding the root 24A of the carbon nanotube 24. FIG. 6C illustrates an embodiment in which an insulating layer 35 is formed on the root portion of the carbon nanotube 24 where the surface of the layer composing the conductive surface 21 is exposed. FIG. 6D covers an embodiment in which the support 20, the conductive surface 21 and the wall 22 comprise a semiconductor 25 wall, and an insulating layer 35 is formed on the surface thereof. All these embodiments, indicate a tunnel junction, and the optimum insulating layer thickness depends upon the driving voltage, the composition and structure of the insulating layer 35. The thickness of the insulating layer 35 should preferably be within a range of from a sub-nm to several tens of nm, or more specifically, from 1 to 10 nm. The composition of the insulating layer 35 may comprise, for example, silicon oxide, titanium oxide, or alumina. The insulating layer 35 may be formed, prior to forming the wall 22 on the conductive surface 21, by oxidizing the conductive surface 21, in the case of FIG. 6A. In the case of the configurations shown in FIGS. 6B and 6C, it may be formed, after forming the wall 22, by oxidizing the wall 22 and the conductive surface 21 or the conductive surface 21 alone.

Figure 12:
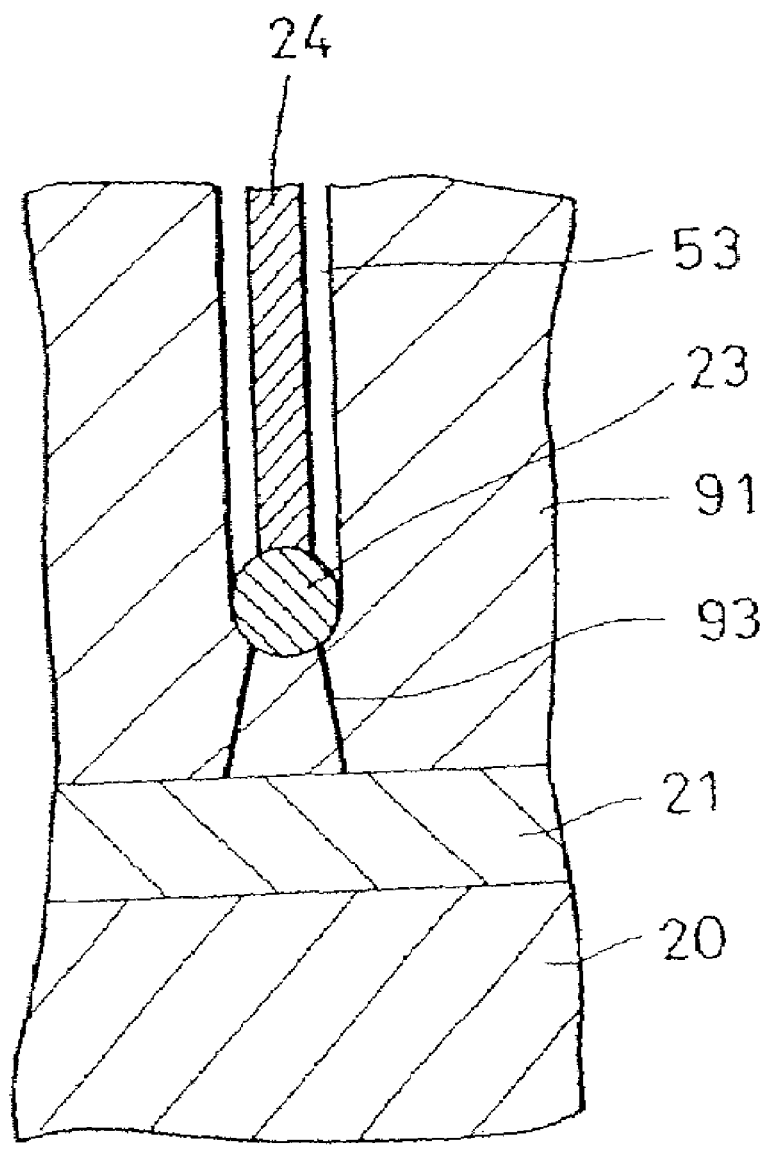
FIG. 12 is a schematic sectional view of another embodiment of the carbon nanotube device of the invention.

FIGS. 5A and 5D and 6A and 6D provide only a few examples. As another example, a configuration shown in FIG. 12 is also within the scope of the present invention. In FIG. 12, 91 is an insulating layer formed on the layer composing a conductive surface 21, and serves also as a wall 22 in this embodiment; 53 is a narrow hole formed in the insulating layer 91; and 93 is a bridge-shaped path connecting the conductive surface 21 and the bottom of the narrow hole 53. A catalytic super-fine particle 23 is provided on the bottom of the narrow hole, and a carbon nanotube 24 is caused to grow vertically to the support surface along the wall 91 of the narrow hole 53. The path 93 improves conductivity between the catalytic super-fine particle 23 formed on the narrow hole 53 bottom and the layer composing the conductive surface 21.

Figure 2A:
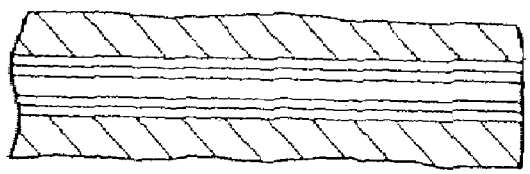
FIGS. 2A and 2B respectively illustrate schematic longitudinal and transverse sectional views of a carbon nanotube with amorphous carbon therearound.
Figure 2B:
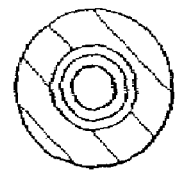
Figure 3A:
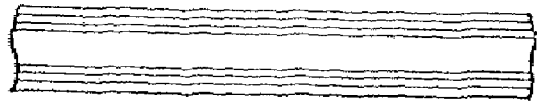
FIGS. 3A and 3B respectively illustrate schematic longitudinal and transverse sectional views of a multi-walled nanotube.
Figure 3B:
Figure 4A:
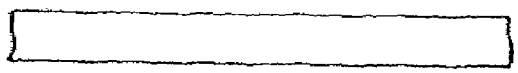
Figure 4B:

The embodiment shown in FIG. 12 has a configuration in which conduction between the carbon nanotube 24 and the conductive surface 21 is ensured via the path 93 and the catalytic super-fine particle 23, and the root of the carbon nanotube 24 to the conductive surface 21 is surrounded by the wall 22 (i.e., the wall of the narrow hole 53), thus representing another embodiment of the carbon nanotube device of the invention having a configuration different from these shown in FIGS. 2 and 3.

For the support 20 in the aforementioned embodiments, when the layer 21 giving the conductive surface as illustrated in FIGS. 5A, 6A to 6C and 12 is separately provided, there is particular restriction imposed on the material, and for example, silicon is applicable unless it is free from the effect of the forming conditions of the carbon nanotube 24 or the forming conditions of the wall 22 (including the conditions for anodic oxidation).

In the carbon nanotube device having a configuration shown in FIG. 5B, 5C, 5D or 6D, for example, a p-type silicon or a n-type silicon semiconductor support is suitably applicable.

When considering insulation property required in the form of a device and heat resistance upon forming the carbon nanotube 24, the wall 22 should preferably comprise a material mainly consisting of alumina or silicon. The term "a material mainly consisting of silicon" means "containing at least one selected from the group consisting of silicon, silicon oxide and silicon carbide (SiC)". The wall 22 made of such a material has a function of serving to guide the direction of growth of the carbon nanotube 24 by forming it so as to surround the root 24A of the carbon nanotube 24 to the conductive surface 21. The wall 22 surrounding the root 24A of the carbon nanotube 24 to the conductive surface 21 can be formed, for example, through a general photolithographic process or a general patterning process such as electronic drawing. When preparing a carbon nanotube device having a configuration (see FIGS. 8A to 8D) in which the conductive surface 21 has carbon nanotubes 24 densely formed thereon that are surrounded by the walls 22, and the individual roots 24A are isolated by the wall 22 layers, silicon or silicon oxide resulting from anodic treatment of silicon (Si) or alumina anodic oxidation of aluminum (Al) is suitably applicable.

The Al anodic oxidation process is a process of oxidizing the surface of Al by using Al as an anode and Pt or the like as a cathode in an oxalic acid solution, and impressing a voltage of about 40 V. In this process, narrow holes 53 having a diameter of from several nm to several tens of nm are obtained on the Al surface, and the surface is simultaneously oxidized into alumina.

A carbon nanotube device of the invention can be obtained, for example, by forming an aluminum thin film on a conductive surface 21, then anodically oxidizing the aluminum thin film, and at this point causing carbon nanotubes 24 to grow from the conductive surface 21 in narrow holes 53 formed in the Al anodic oxidized film (alumina film). The conductive surface 21 should preferably comprise a layer containing at least one element selected from the group consisting of titanium (Ti), zirconium (Zr), niobium (Nb), tantalum (Ta), molybdenum (Mo), copper (Cu) and zinc (Zn), or more preferably, layer comprising Nb. That is, when the conductive surface 21 is formed from such a material the narrow holes 53 formed in the alumina film never disappear, and anodic oxidation of Al never peels off the alumina film from the conductive surface 24. It is also excellent in heat resistance at high temperatures when forming the carbon nanotube film to be carried out subsequently. When the conductive surface 21 is formed of such a material, it is possible to form a bridge-shaped path 93 containing the material composing the conductive surface 21, connecting the narrow hole 53 bottom and the conductive surface 21, in the alumina film present between the narrow hole 53 and the layer composing the conductive surface 21, as shown in FIG. 12, by continuing anodic oxidation even after the completion of oxidation of the Al film. Because this path 93 can improve conductivity between the narrow hole 53 bottom and the conductive surface 21, it is particularly desirable to compose the conductive surface 21 with the aforementioned material when applying the carbon nanotube device of the invention to an electron emitting device.

Figure 9A:
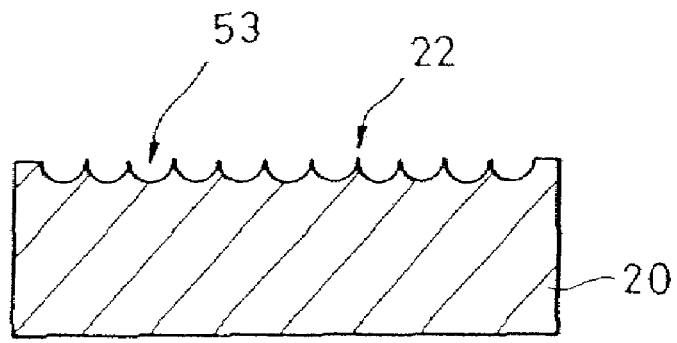
FIGS. 9A to 9C are schematic process diagrams illustrating a manufacturing process of an upright type carbon nanotube device using Si narrow holes.
Figure 9B:
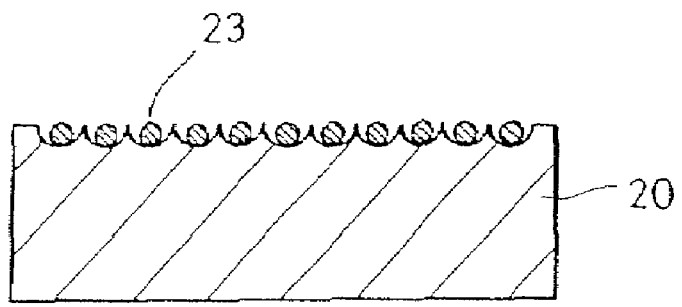
Figure 9C:
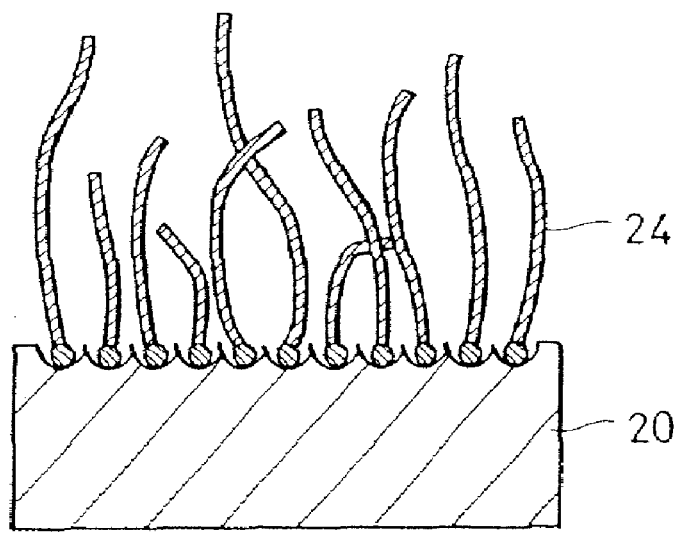

Anodic treatment of Si is carried out by using an Si support as an anode and platinum as a cathode in a fluoric acid solution, and feeding a current of several tens of mA/cm$^2$. This method makes it possible to form a plurality of narrow holes 53 isolated from each other by silicon or silicon oxide on the Si support surface, as shown in FIGS. 9A to 9C, for example. It is therefore possible to obtain a carbon nanotube device of the invention by preparing a conductive silicon support (p-type Si or the like) as a support 20, anodizing the surface of the conductive silicon support 20 to form narrow holes 53 isolated by silicon or silicon oxide, and causing carbon nanotubes 24 to grow from the bottom of the narrow holes 53.

When forming a carbon nanotube 24 in the narrow hole 53 resultant from Al anodic oxidation or anodization of Si as described above, it is recommendable to form a catalytic super-fine particle 23 on the narrow hole 53 bottom, i.e., on the conductive surface 21, and to cause the carbon nanotube 24 to grow from the surface of this catalytic super-fine particle 23. Applicable catalyst materials include, for example, iron (Fe), cobalt (co) and nickel (Ni).

The catalytic super-fine particle 23 should preferably have a particle diameter within a range of from 1 to 10 nm, or more preferably, from 2 to 50 nm. A catalyst of such a material having such a size can efficiently cause a carbon nanotube 24 to grow and achieve a size excellent in electron emitting efficiency.

For depositing such a catalytic super-fine particle 23 into the narrow hole 53, for example, the AC electro-deposition process is effectively applicable.

When preparing a Co super-fine particle, for example, it suffices to impress an AC (50 Hz) voltage of about 15 V to a space between the conductive surface 21 and the opposed electrode in an aqueous solution of $CoSO_4 \cdot 7H_2O = 5\%$ and $H_3BO_3 = 2\%$. This method permits introduction of the catalytic super-fine particle 23 even into the slightest narrow hole 53 formed by, for example, the Al anodic oxidation.

Another method for introducing the catalytic super-fine particle 23 into the narrow hole 53 comprises vapor-depositing Fe, Co or Ni onto the conductive surface 21 having a narrow hole 53 and a wall 22, and thermally aggregating this vapor-deposited film.

An effective method for causing a carbon nanotube 24 to grow on the conductive surface 21 surrounded by the thus formed carrier, or on the conductive surface 21 surrounded by the wall 22 and provided with the catalyst comprises, for example, thermally treating the support 20 in a gas atmosphere containing not only the raw material gas, but also added with a diluent gas or a growth accelerator gas. Many gases containing carbon are applicable as a raw material gas.

Examples of the raw material gas include gases comprising only carbon and hydrogen, such as methane, ethane, propane, butane, pentane, hexane, ethylene, acetylene, benzene, toluene and cyclohexane, and gases comprising carbon, hydrogen and other elements, such as benzonitrile, acetone, ethyl alcohol, methyl alcohol and carbon monoxide.

Preferable raw materials from among these applicable ones, somewhat varying with the kind of the support 20, the composition of the growth nucleus, growing temperature and pressure, are ones comprising carbon, hydrogen and oxygen, which make it difficult for impurities to come in.

In view of the low temperature growth of the carbon nanotube 24, ethylene, acetylene and carbon monoxide are preferable. Hydrogen is preferable as a growing or growth accelerating gas. However, because effectiveness of hydrogen depends upon the raw material gas, the reaction temperature, and the composition of the growth nucleus, hydrogen is not an essential requirement.

A diluent gas is effective when growth rate is too high, or when alleviating toxicity or explosivity of the raw material gas, and applicable diluent gases include inert gases such as argon and helium and nitrogen.

The manufacturing method of an embodiment of the carbon nanotube device of the invention shown in FIGS. 8A to 8D will now be described in detail.

Figure 8A:
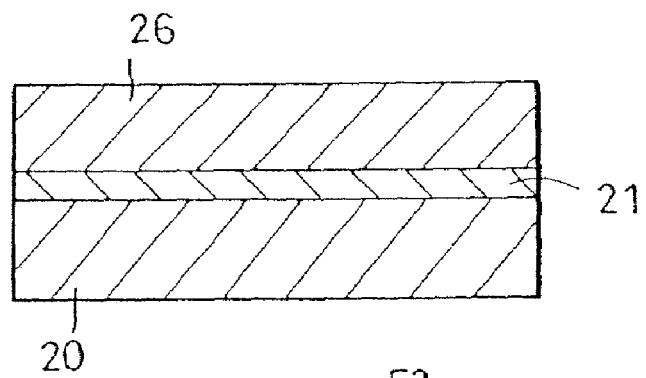
FIGS. 8A to 8D are schematic process diagrams illustrating a manufacturing process of an upright type carbon nanotube device using alumina narrow holes.

First, as shown in FIG. 8A, a film mainly comprising Ti, Zr, Nb, Ta, Mo, Cu or Zn is formed on an Si wafer support, and then an Al film is formed without exposure to the air. This film forming method is typically represented by the sputtering process based on a sputtering apparatus having multiple targets.

Figure 13:
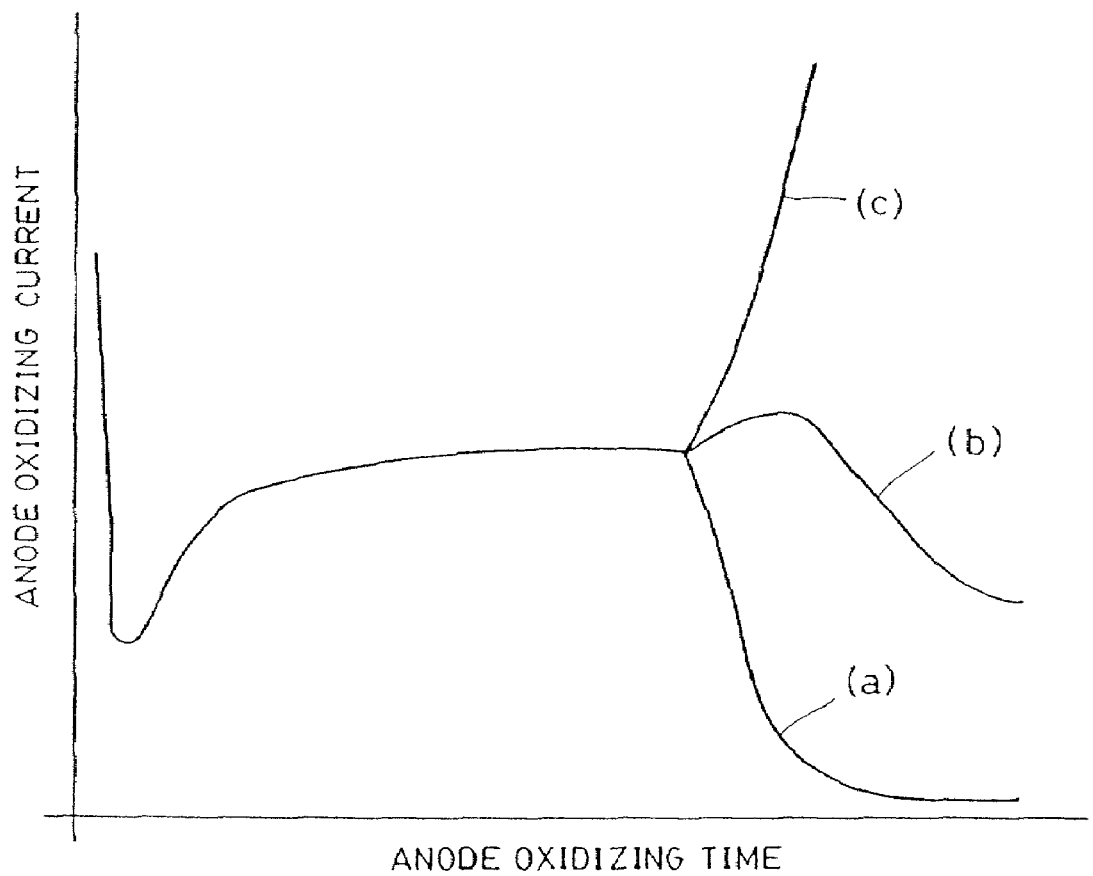
FIG. 13 is a schematic view illustrating a change in anodic oxidizing current when forming Al films on conductive surfaces comprising various materials and causing anodic oxidation of the Al films.
Figure 14:
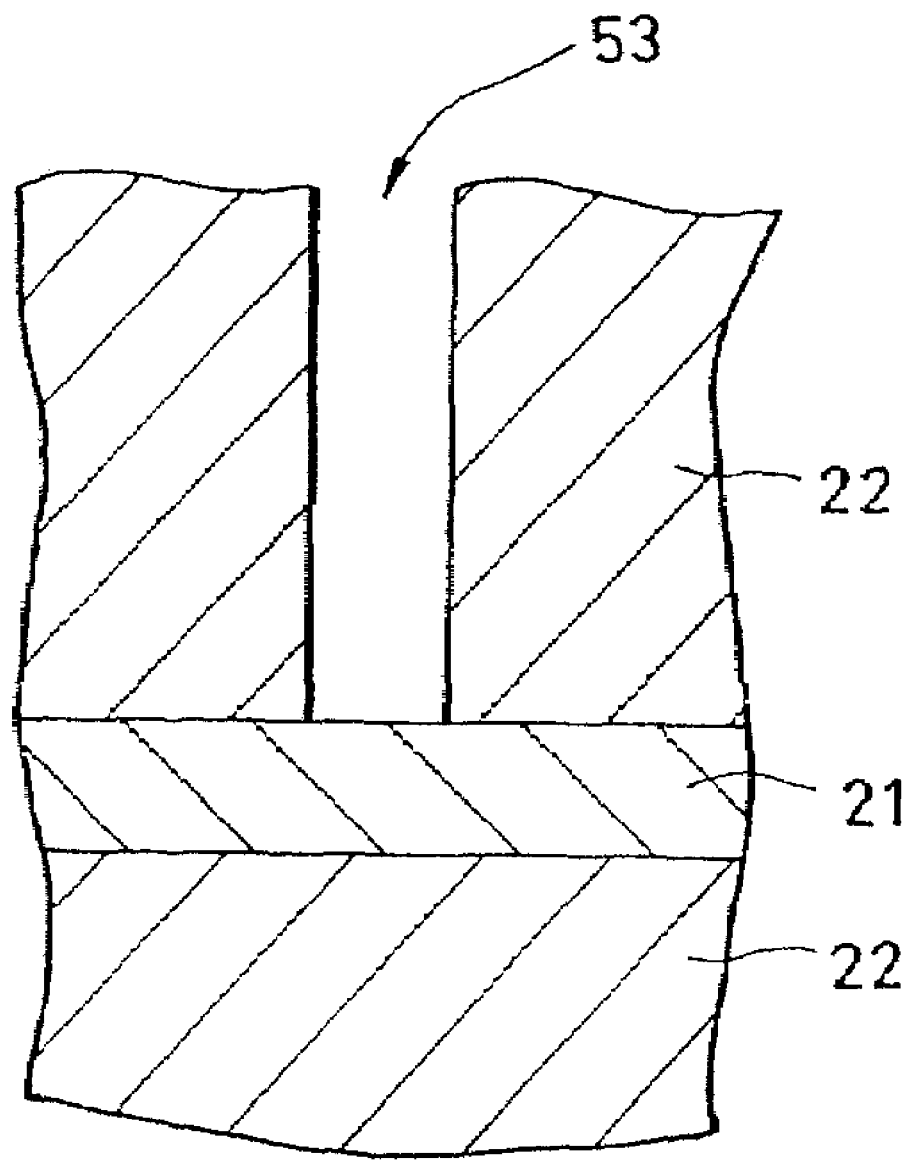
FIG. 14 is a schematic sectional view of a support provided with a wall, applicable for forming the carbon nanotube device shown in FIG. 5A.

Then, the support 20 is immersed in a 0.3 M oxalic acid solution for anodic oxidation of Al, and a voltage of 40 V is impressed with the support 20 as an anode and a Pt as a cathode while keeping a temperature of 17° C. As a result, as shown in FIG. 13, the Al surface is first oxidized, leading to a decrease in current value which however increases along with formation of narrow holes 53 resulting from oxidation of the Al film, and shows a constant value. Upon the completion of oxidation of the Al film thereafter, the current value caries with the material composing the conductive surface 21. For example, the layer composing the conductive surface 21 comprises Ti, Zr, Nb, Ta or Mo, the anodic oxidizing current exhibit a decrease as shown in curve (a) on FIG. 13. When the layer composing the conductive surface 21 is formed with Cu or Zn, on the other hand, the anodic oxidizing current shows once an increase and then a decrease as shown in curve (b) on FIG. 13. It is possible to manufacture a structure for a carbon nanotube device shown in any of FIGS. 5A to 5D, 6A to 6D, FIGS. 12 and 14 through selection of a material for the conductive surface 21 and control of timing for stoppage of anodic oxidation.

Figure 8B:
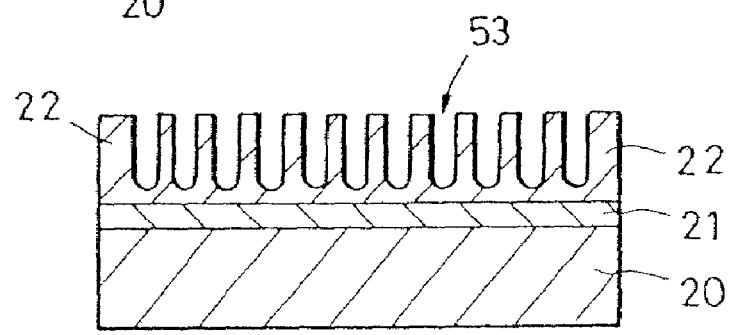

When forming the conductive surface 21 with Ti, Zr, Nb, Ta or Mo, and anodic oxidation of the Al film formed on the conductive surface 21 is discontinued immediately prior to a decrease in the anodic oxidizing current curve, for example, the Al layer formed on the conductive surface totally oxidized in the thickness direction into alumina as shown in FIG. 8B. The narrow hole 53 has not as yet reached the conductive surface 21, and there is available a structure in which alumina is present with a thickness of from about 1 to 10 nm between the bottom of the narrow hole 53 and the conductive surface 21. This structure is applicable as a structure for a carbon nanotube device in which the wall 22 and the insulating layer 35 are made of the same material in the carbon nanotube device, shown in FIG. 6B, in which the conductivity between the carbon nanotube 24 and the conductive surface 21 tunnel effect.

When composing the conductive surface with Ti, Zr, Nb, Ta or Mo, and anodic oxidation of the Al film formed on the conductive surface 21 is discontinued after start of a decrease in the anodic oxidizing current curve, it is possible to form a path 93 between the conductive surface 21 and the bottom of the narrow hole 53 as shown in FIG. 12. This path 93 is known, as a result of a material analysis, to contain the material composing the conductive surface 21, i.e., Ti, Zr, Nb, Ta or Mo and oxygen, and formation of this path permits considerable improvement of conductivity between the conductive surface 21 and the narrow hole 53. This further leads to improvement of depositing efficiency of a catalytic super-fine particle 23 to the narrow hole 53, and remarkable improvement of conductivity between the conductive surface 21 and a carbon nanotube 24 upon formation of the carbon nanotube 24 in the narrow hole 53. Although the reason of formation of the path is not clear, alumina solution into the electrolyte occurs on the bottom of the narrow hole 53 in the process of formation of the narrow hole 53 through anodic oxidation of the Al film, and a phenomenon is observed in which Al ions are drawn through the Al portion anodically oxidized by the electric field into the electrolyte along with oxidation of Al at the interface of anodic oxidation (interface between alumina and Al). It is considerable, from this observation, that, when continuing anodic oxidation even after the completion of anodic oxidation of the Al film, anodic oxidation reaches the conductive surface 21, and serves to draw out the material composing the conductive surface 21 (for example, Ti, Zr, Nb, Ta or Mo) through the alumina layer on the bottom of the narrow hole 53 into the electrolyte. Because the oxide of Ti, Zr, Nb, Ta or Mo is chemically stable and is not easily dissolved into the electrolyte, it is considered that alumina remains in the form of the path 93 on the bottom of the narrow hole 53.

When annealing the structure having the path 93 formed therein in a hydrogen gas, inert gas, or hydrogen and inert gas atmosphere, conductivity between the conductive surface 21 of the structure and the narrow hole 53 can further be improved. The reason of improvement of conductivity between the conductive surface 21 of the structure and the narrow hole 53 by annealing in not as yet clear, but is considered attributable to the reduction of the path 93.

The further improvement of conductivity between the conductive surface 21 of the structure and the narrow hole 53 in turn improves deposition efficiency of the catalytic super-fine particle 23 onto the bottom of the narrow hole 53, and further improves conductivity between the conductive surface 21 and a carbon nanotube 24 after forming the carbon nanotube 24 in the narrow hole 53. This is therefore a process which is preferable particularly when applying the carbon nanotube device of the invention to an electron emitting device. Annealing should preferably be carried out at a temperature within a range of from 200 to 1,100° C. for a period of time within a range of from 5 to 60 minutes.

When the conductive surface 21 comprises Cu or Zn, and anodic oxidation is discontinued after start of decrease in anodic oxidizing current, a structure having a narrow hole 53 reaching the conductive surface 21 is available as shown in FIG. 11. This structure is applicable as a structure for a carbon nanotube device in which the carbon nanotube 24 binds directly to the exposed conductive surface 21 as shown in FIG. 5A.

In the aforementioned structures in the above embodiments, the diameter of the narrow hole 53 can be enlarged by immersing the structure into a phosphoric acid solution of about 5 wt. %.

A carbon nanotube device as shown in FIGS. 5A to 5D, 6A to 6D or 12 is available by depositing the catalytic super-fine particle 23 into the narrow hole 53 by the use of the aforementioned method, and causing a carbon nanotube 24 to grow from the surface of the deposited catalytic super-fine particle 23.

Figure 7:
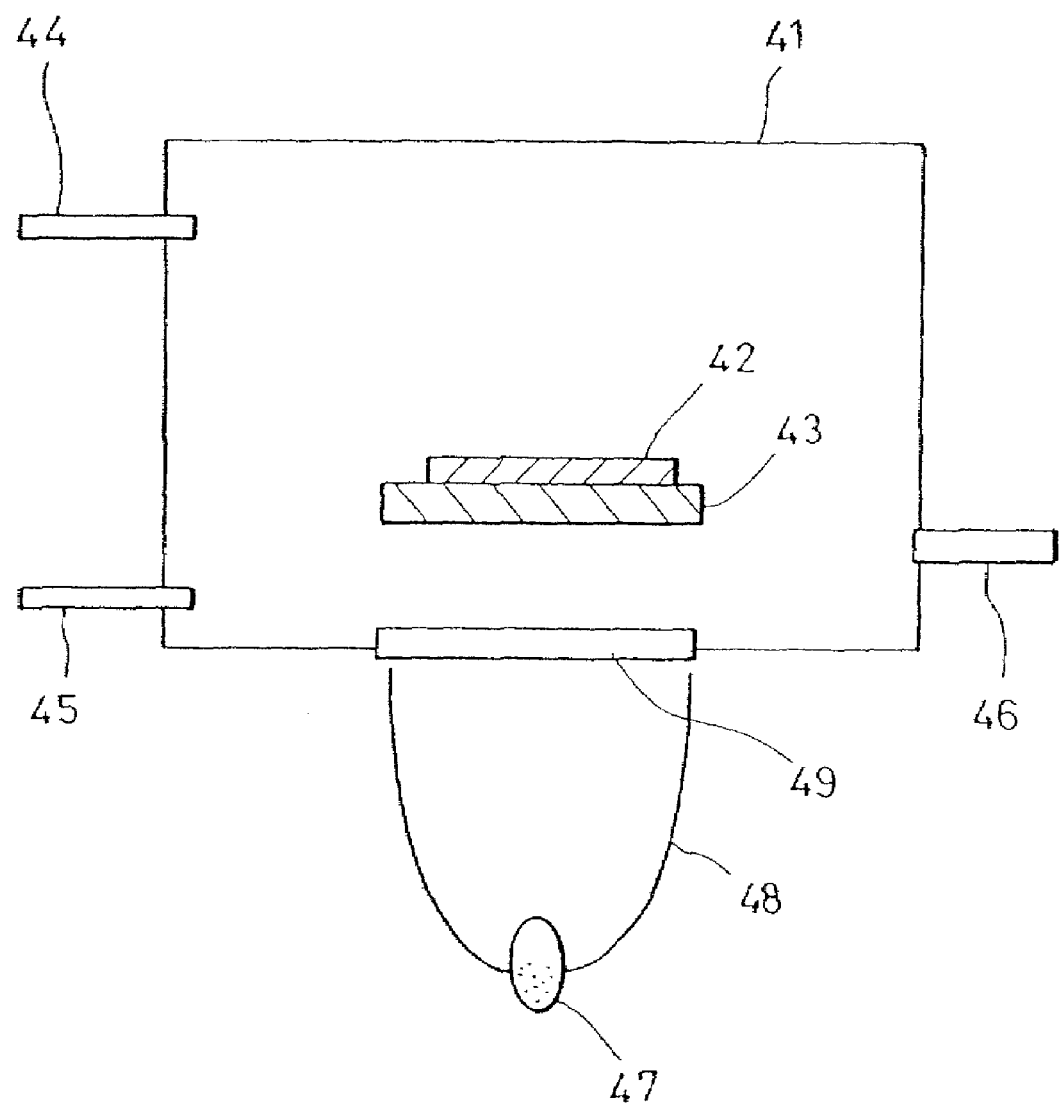
FIG. 7 is a schematic view illustrating a carbon nanotube growing apparatus.

Growth of a carbon nanotube 24 can be accomplished by the use of for example, a reactor as shown in FIG. 7. This will now be described with reference to FIG. 7.

In FIG. 7, 41 is a reactor; 42 is a support; 43 is an infrared-ray absorbing plate, serving also as a support holder; 44 is a tube for introducing a raw material gas such as ethylene, and should preferably be arranged so as to achieve a uniform raw material gas concentration near the support 42; 45 is a tube for introducing a reaction accelerating gas such as hydrogen or a diluent gas such as helium; and the raw material gas tube 44 is arranged near an infrared-ray transmitting window 49 so as to serve to prevent the window 49 from being dim with decomposition of the raw material gas.

Also in FIG. 7, is a gas exhaust line 46 which is connected to a turbo molecular pump or a rotary pump (not shown); 47 is an infrared lump for heating the support; and 48 is a condensing mirror for collecting efficiently infrared rays for absorption. Although not shown, a vacuum gauge for monitoring pressure within the container; a thermocouple for measuring temperature of the support 42 and the like are provided.

The apparatus is not of course limited to those described here. An electric furnace type apparatus heating the entire assembly from outside may well be employed. In actual growth of a carbon nanotube 24, steps comprise, for example, introducing ethylene as a raw material gas in an amount of 10 sccm from the raw material gas tube 44 into the apparatus, introducing 10 sccm hydrogen as the growth accelerating/diluent gas from the reaction accelerating gas tube 45; applying a pressure of 1000 Pa in the reactor, heating the support 42 by an infrared-ray lamp to 700° C. and causing a reaction for 60 minutes.

The diameter of the thus synthesized carbon nanotube 24, depending upon the diameter of the catalytic super-fine particle 23 and other reaction conditions, is within a range of from several nm to a submicron size and the length is within a range of from several tens of nm to several tens of μm. Since a terminus of the carbon nanotube 24 already binds conductively to the conductive surface, the carbon nanotube device of the invention is favorable particularly in such applications as electric field electron emission, a probe such as STM, a quantum device, a vibrator for a micromachine, and various electrodes.

Because carbon is chemically stable and has a high strength, the invention is applicable also for the purposes of improving the support 42 surface.

Figure 8C:
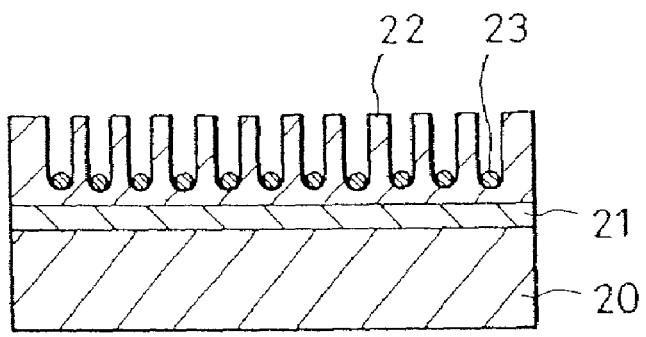
Figure 8D:
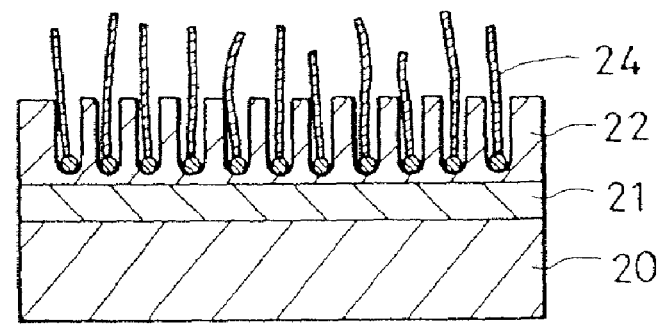
Figure 15:
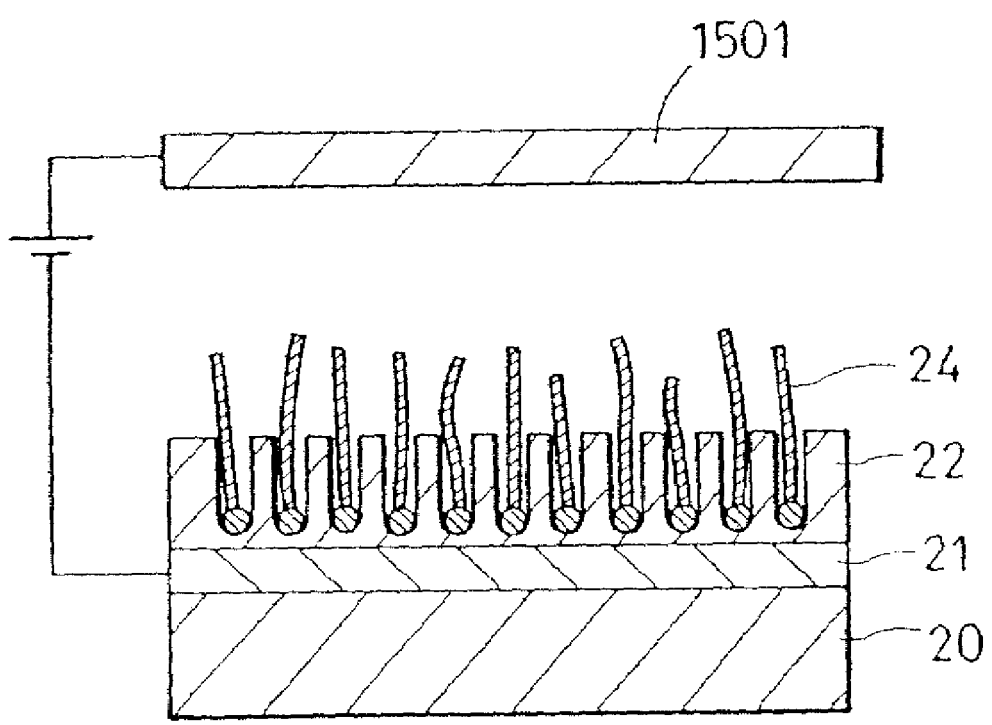
FIG. 15 is a schematic sectional view of an electron-emitting device which is made by using a carbon nanotube device shown in FIG. 8D.

As shown in FIG. 15, by locating a counter electrode 1501 at a position opposite to the conductive surface 21 of the carbon nanotube device of the present invention, for example, shown in FIG. 8D, an electron-emitting device can be obtained. The electron-emitting device in FIG. 15 is constructed in such a manner that a potential can be impressed between the electrode 1501 and the conductive surface 21.

The present invention will now be described further in detail by means of examples.

EXAMPLE 1

(1) An Si wafer support having a clean surface was provided as a support. Ti was formed into a film having a thickness of 100 nm on the surface of the Si wafer by the sputtering process. The sputtering was carried out by applying RF power of 400 W and under Ar gas partial pressure of 5 mm Torr. After forming the Ti film, an Al film having a thickness of 1 μm was formed under the same conditions except for changing the target to Al in the same apparatus, thereby preparing a support 20 as shown in FIG. 8A.

A support having the layered structure as shown in FIG. 8A was prepared in the same manner as above except that the Ti thin film was changed to a Zr, Nb, Ta, Mo, Cu, Zn, Pd or Au thin film.

Each of the resultant supports was immersed in a 0.3 M oxalic acid solution, and then anodic oxidation of Al was carried out by using the support as an anode and Pt as a cathode and applying a voltage of 40 V while keeping a temperature of 17° C. As shown in FIG. 13, the beginning of the anodic oxidation, anodic oxidizing current decreased due to rapid oxidation of the Al surface. Toward the start of formation of a narrow hole 53 along with oxidation of the Al film, the current showed substantially a constant value. Thereafter, for each support having a conductive surface 21 comprising a Ti film, a Zr film, an Nb film, a Ta film, or an Mo film, anodic oxidation was discontinued after a rapid decrease in current value as shown by a curve (a) in FIG. 13. The period was for about ten minutes. These supports shall hereinafter be called Group (1) supports.

For each support in which the conductive surface comprised a Cu film or a Zn film, anodic oxidation was discontinued upon decrease after one increase in current value as shown by a curve (b) in FIG. 13. The period was for about ten minutes. These supports shall hereinafter be called Group (2) supports.

For each support in which the conductive surface comprised a Pd film or an Au film, anodic oxidation was discontinued after a sharp increase in current value as shown by a curve (c) in FIG. 13. The period was for about ten minutes. These supports shall hereinafter be called Group (3) supports.

For these Groups (1) to (3) supports as described above, structures were analyzed by means of a transmission type electron microscope: in Group (1) supports, the aluminum film on the conductive surface was completely oxidized in the thickness direction as shown in FIG. 12, and the narrow hole 53 did not reach the conductive surface. It was confirmed that a bridge-shaped path 93 containing a metal (for example, Ti, Zr, Nb, Ta or Mo) composing the conductive surface was formed between the conductive surface and the bottom of the narrow hole.

For Group (2) supports, it was confirmed that the Al film on the conductive surface was fully oxidized in the thickness direction, and the narrow hole reached the conductive surface as shown in FIG. 5A. For Group (3) supports, although the Al film on the conductive surface was oxidized, the narrow holes had disappeared. The reason of disappearance of the narrow holes is not clear, but it is considered attributable to the fact that a reaction between the conductive surface and the electrolyte produced a large electric current, and oxygen gas produced along with this destroyed the narrow holes.

(2) Layers as shown in FIG. 8A having a Ti film, a Zr film, an Nb film, a Ta film or an Mo film formed on the Si wafer support surface were prepared in the same manner as in (1) above. Each of these supports was immersed in a 0.3 M oxalic acid solution, and anodic oxidation of Al was carried out by using the support as an anode and Pt as a cathode and applying a voltage of 40 V while keeping a temperature of 17° C. Anodic oxidation was discontinued immediately before observing a decrease in anodic oxidizing current as represented by curve (a) in FIG. 13. The period was for about eight minutes. These supports shall hereinafter be called Group (4) supports. The structure was analyzed for Group (4) supports by the use of a transmission type electron microscope. The aluminum film on the conductive surface was completely oxidized in the thickness direction, and the narrow hole 53 did not reach the conductive surface as in Group (1) supports. The path observed in Group (1) supports was not observed.

Then, easiness of plating onto the narrow hole surface was measured by the following method for Group (1) and Group (4) supports. The steps comprised immersing each of Group (1) and Group (4) supports in an aqueous solution containing 5 wt. $CoSO_4 \cdot 7H_2O$, and 2 wt. % $H_3BO_3$, applying a potential between opposed Co electrodes, and measuring the potential necessary for plating Co particles on the narrow hole bottom as a support potential corresponding to a calomel standard electrode. The resultant potential value was within a range of from about $-1$ to $-1.5$ V for Group (1) supports, whereas a potential of at least $-10$ V was required for Group (4) supports. This suggests that the bridge-shaped path 93 formed in Group (1) supports played an important role for improvement of conductivity between the bottom of the narrow hole and the conductive surface.

(3) Group (1), (2) and (4) supports were prepared in the same manner as described under (1) and (2) above.

Then, a catalytic super-fine particle 23 was prepared by the AC electro-deposition process on the bottom of the narrow hole for each support. The support having narrow holes thus prepared was immersed in an aqueous solution containing 5% $CoSO_4.7H_2O$ and 2% $H_3BO_3$, and a structure having Co super-fine particles on the bottom of the narrow holes as shown in FIG. 8C was obtained by impressing an AC (50 Hz) voltage of 15 V for few seconds.

Then, a carbon nanotube was grown in a reactor as shown in FIG. 7. First, the support having the catalytic super-fine particles was placed in the reactor, then hydrogen in an amount of 10 sccm was introduced from a reaction accelerating gas tube 45 and a pressure of 500 Pa was kept in the reactor. The support temperature was brought to between 400 and 800° C. by turning on an infrared lamp.

After temperature stabilization, a raw material gas such as methane, ethylene, acetylene, carbon monoxide or benzene was introduced in an amount of 10 sccm from a raw material gas tube 44, and the pressure in the reactor of 1000 Pa was kept for 20 minutes. Then, the infrared lamp was turned off to interrupt the supply of gas, and the support was taken out into the open air after bringing the support temperature to the room temperature.

The support thus taken out was observed by means of an FE-SEM (Field Emission-Scanning Electron Microscope). In all the observed supports, carbon nanotubes had grown from the catalytic super-fine particles on the bottom of the narrow holes as shown in FIG. 8D. The carbon nanotube had a diameter within a range of from several nm to several tens of nm, depending upon the raw material gas and the catalytic super-fine particle, and had grown in the vertical direction along the narrow hole from the support with a terminus of the carbon nanotube 24 binding to the support.

When methane was used as a source gas, however, growth of the carbon nanotube was less remarkable. With a source gas of benzene, there were fluctuations in diameter among carbon nanotubes: the largest diameter was almost the same as that of the narrow hole. The optimum growth temperature of the carbon nanotube was higher in the order of carbon monoxide, acetylene, ethylene, benzene and then methane.

For the purpose of evaluating properties of the resultant carbon nanotube devices, each of the carbon nanotube devices of Groups (1), (2) and (4) was placed in a vacuum chamber, and an opposite electrode was arranged at a distance of 0.1 mm from the support in parallel therewith so that the carbon nanotube forming surface of the support faced the electrode. After evacuating the chamber to $10^{-8}$ Torr, a positive voltage was impressed to the opposite electrode, and the quantity of electrons emitted from the carbon nanotube was measured. As a comparative example, three kinds of supports having a conductive surface were prepared by using the same materials as those of Group (1), (2) and (4) supports respectively. Then ethanol dispersing carbon nanotubes was coated on the respective conductive surfaces of the supports. The amount of the carbon nanotube coated on the surface was almost the same as those of the Group (1), (2) and (4) carbon nanotube devices each of which was prepared by using ethylene as a raw material gas. Subsequently, the quantity of electrons emitted form the respective supports provided with the carbon nanotube coatings was measured in the same manner as the Group (1), (2) and (4) carbon nanotube devices.

As a result, as to Groups (1), (2) and (4) carbon nanotube devices, emitted current was observed starting from impression of about 100V, and the amount of current upon impressing 200V, was ten times larger than that available from a film in which carbon nanotubes were simply dispersed.

This is attributable to the fact that the carbon nanotubes were sufficiently connected to the electrode and the isolated carbon nanotubes extended in the vertical direction. These results permitted confirmation that the device of the invention had an excellent function as an electron emitting source.

Among Group (1), (2) and (4) carbon nanotube devices, the quantity of emitted electrons was larger in the order of Group (2), Group (1) and the Group (4).

(4) Group (1) support was prepared in the same manner as described under (1) above. After heat-treating the support in a mixed gas of $H_2$:He=2.98 (volume ratio) at 500° C. for an hour, a carbon nanotube device was prepared in the same manner as in (3) above. By the use of this carbon nanotube device, the quantity of emitted electrons was measured in the same manner as in (3) above. As a result, a quantity of emitted electrons even superior to that of the carbon nanotube device prepared by the use of Group (1) support, as measured in (3) above, was confirmed. The reason why the carbon nanotube device prepared by the use of a heat-treated support gives such an effect is not clear. As a result, however, of the improvement of conductivity of the path brought about by the reduction of the path in the heat treatment, the depositing efficiency of the catalytic super-fine particles onto the narrow holes is considered to be improved, and this further improves conductivity between the conductive surface and the carbon nanotube.

EXAMPLE 2

An example of the manufacturing method when the catalytic metal and the electrode film are the same will now be described.

As in Example 1, by the use of an Si wafer substrate cleaned as a support, a Co film having a thickness of 0.1 µm was formed on the support by the RF sputtering process. Then, in the same apparatus with the target changed to Al, and Al film was continuously formed into a thickness of 0.2 µm to form an Al/Co layered film. The sputtering conditions included an RF power of 400 W and an Ar atmosphere at 5 mTorr.

This support was immersed in a 0.3 M oxalic acid solution, and the Al film was anodically oxidized by using support as an anode and Pt as a cathode and impressing 40 V while keeping a temperature of 17° C. As a result of voltage impression, the Al surface was first rapidly oxidized, leading to a decrease in current value. After start of formation of narrow holes, the current value increased to a constant value. Upon the completion of oxidation of the Al film, the narrow hole reached the undercoat Co layer and the current value gradually increased Anodic oxidation was therefore discontinued at this point. The period was for about two minutes.

To widen the bore of the narrow holes, the support was immersed in a phosphoric acid solution of about 5 wt. % for 40 minutes and taken out. A support provided with an alumina film, having narrow holes of a diameter of about 50 nm on the surface was obtained. As a result of this treatment, the undercoat Co surface was exposed on the bottom of the narrow holes and could be used as a catalyst portion.

Then, the support was place in a reactor as shown in FIG. 7, and hydrogen gas was introduced in an amount of 20 sccm from the reaction accelerating gas tube 45 to bring the pressure in the reactor to 500 Pa. The support temperature was increased to 600° C. by turning on an infrared lamp.

After stabilization of temperature, use the raw material gas ethylene diluted with nitrogen to 10% was introduced in an amount of 20 sccm to bring pressure in the reactor to 1,000 Pa which was kept for 20 minutes. Thereafter, the infrared lamp was turned off to interrupt the supply of gas, and then, the support temperature was brought back to the room temperature. The support was then taken out into the open air.

The surface of the resultant support was observed by means of an FE-SEM: carbon nanotubes had grown from the narrow hole portion, but the carbon nanotubes had a large diameter of several 10 nm, and there were observed many portions of the narrow holes where the growth did not occur. This suggests that the catalyst present in the narrow holes should preferably be in the form of super-fine particles as in Example 1.

For the purpose of evaluating properties of the resultant carbon nanotube device, the Co film of the support attached with an electrode was placed in a vacuum chamber as in Example 1, and an opposite electrode was arranged at a distance of 0.1 mm from the support in parallel therewith. After evacuating the chamber to $10^{-8}$ Torr, a positive voltage was impressed to the opposite electrode, and the quantity of electrons emitted from the carbon nanotubes was measured.

As a result, emitted current was observed starting from impression of about 150 V, and the amount of current upon impressing 200 V, which was about a half that in Example 1, was several times as large as that available from a film in which carbon nanotubes were simply dispersed. This permits formation that the device of the invention has a sufficient function as an electron emitting source.

The amount of emitted current is smaller than that available from the electron emitting device prepared by the use of the carbon nanotubes of Example 1. This is considered attributable to the fact that, although the carbon nanotubes are sufficiently connected to the electrode, the diameter of the nanotube is somewhat large, resulting in insufficient concentration of electric field and a low growth density of the carbon nanotube.

EXAMPLE 3

An example of carbon nanotube device in which the wall, the layer composing the conductive surface and the support are all prepared with Si will now be described with reference to the schematic process descriptive view shown in FIGS. 9A to 9C and the equipment schematic diagram shown in FIG. 7.

An ohmic contact was prepared by using a p-type substrate having a low resistance (several mm to several hundred mmΩcm) as a support, forming an Al film having a thickness of about 1 µm on the back of the p-type Si substrate and annealing at 400° C.

Then, anodization of the support was carried out with the support immersed in an aqueous solution containing 10% fluoric acid and 5% alcohol to serve as an anode and with Pt as a cathode. Al on the back was arranged so as not to come into contact with the fluoric acid solution, and an electrode was taken from the Al surface. Conditions were set to give a current value of several tens of mA/cm$^2$ upon anodization. After the completion of anodization, the support was taken out, and washed with distilled water and IPA. As a result of this process, narrow holes of several nm to several tens of nm as shown in FIG. 9A were formed on the Si surface, and the individual narrow holes were isolated from each other by p-type Si walls 22.

The support was placed in a vacuum depositing unit and evacuation was carried out up to a degree of vacuum of $10^{-6}$ Torr, and Fe was vapor-deposited into a thickness of 0.3 nm on the upper surface by the resistance heating vapor depositing process. Thermal aggregation of the vapor-deposited film was accomplished by heating the support to 700° C. while keeping a vacuum. This resulted in a structure in which catalytic super-fine particles were placed in the narrow holes as shown in FIG. 9B.

Then, the support was placed in the reactor shown in FIG. 7. First, hydrogen gas was introduced in an amount of 20 sccm from the reaction accelerating gas tube 45 to keep a pressure of 500 Pa in the reactor. The support temperature was increased to 650° C. by turning on an infrared lamp. After stabilization of temperature, ethylene was introduced in an amount of 20 sccm to bring the pressure in the reactor to 2,000 Pa, which was kept for 20 minutes. Thereafter, the infrared lamp was turned off to cut the supply of the gas. Then, after bringing the support temperature to the room temperature, the support was taken out into the open air, thereby obtaining a carbon nanotube device.

Another carbon nanotube device was prepared in the same manner as above except that Co, Ni or Pd was used as a material for the catalytic super-fine particles.

The surfaces of these four kinds of carbon nanotube devices were observed by means of an FE-SEM. For the devices using Fe, Co and Ni as catalysts, while growth of the carbon nanotubes from the narrow hole portion was observed, almost no growth of the carbon nanotubes in the narrow holes was observed for the device using Pd.

For the purpose of evaluating properties of the resultant carbon nanotube devices prepared by the use of Fe, Co or Ni as a catalyst, the support attached with an electrode was placed in a vacuum chamber, and an opposite electrode was arranged at a distance of 0.1 mm from the support in parallel therewith, as in Example 1. After evacuating the chamber to $10^{-8}$ Torr, a positive voltage was impressed to the opposite electrode, and the quantity of electrons emitted from the carbon nanotube was measured.

As a result, the electron emission was observed, starting from impression of about 100 V, and the amount of current upon impressing 200 V was about ten times as large as that of a film in which carbon nanotubes were simply dispersed.

This is attributable to the fact that the carbon nanotubes were sufficiently connected to the electrode and the isolated carbon nanotubes extended in the vertical direction from the support. This permitted confirmation that the device of this example had an excellent function as an electron emitting source.

EXAMPLE 4

A configuration of a tip type carbon nanotube device and a typical manufacturing method thereof will now be described with reference to the process schematic descriptive views shown in FIGS. 10A to 10D and the equipment schematic diagram shown in FIG. 7.

Figure 10A:
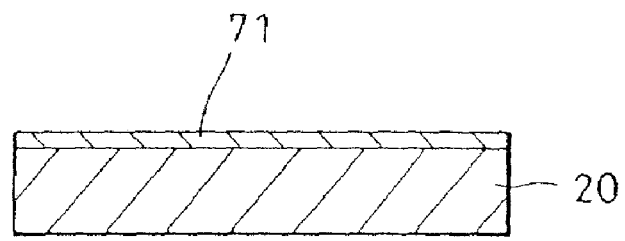
FIGS. 10A to 10D are schematic process diagrams illustrating a manufacturing process of a tip type carbon nanotube device.
Figure 10B:
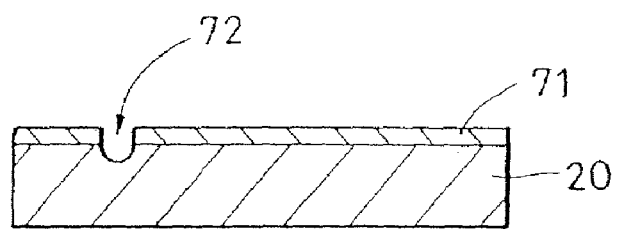
Figure 10C:
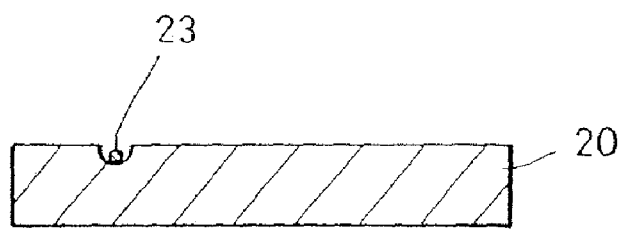

A resist 71 (AZ manufactured by Hext Company) was coated into a thickness of 0.5 to 1 µm by means of a spinner as shown in FIG. 10A on a low-resistance Si wafer serving as a support. After UV exposure with the use of a mask, the exposed portion was peeled off with an organic solvent, and a submicron (0.1 to 1 µm) hole was pierced on the resist. A hole 72 was prepared also in the Si wafer by introducing the support into a plasma etching unit, and etching the Si wafer from the hole portion of the resist. The etching conditions included $SF_4$ gas of 5 Pa, an RF power of 150 W, and a treating period of a minute. Then, the support was placed in a resistance heating vapor depositing unit and a Co—Ni alloy (composing ratio: 1:1) film was formed into a thickness of 1 nm on the resist layer surface and the hole surface of the Si wafer. Then, the resist was lifted off, and thermal aggregation of the Co—Ni thin film was caused by annealing it in vacuum at 500° C. to convert it into a catalytic super-fine particle 73.

Then, the support was placed in the reactor shown in FIG. 7. First, hydrogen gas was introduced in an amount of 20 sccm from the reaction accelerating gas tube 45 to keep a pressure of 500 Pa in the reactor. The support temperature was increased to 700° C. by turning on an infrared lamp. After stabilization of temperature, acetylene gas diluted with nitrogen (90%) was introduced in an amount of 20 sccm to bring the pressure in the reactor to 3,000 Pa, which was kept for 20 minutes. Thereafter, the infrared lamp was turned off to discontinue the supply of the gas. Then, after bringing the support temperature to the room temperature, the support was taken out into the open air.

Figure 10D:
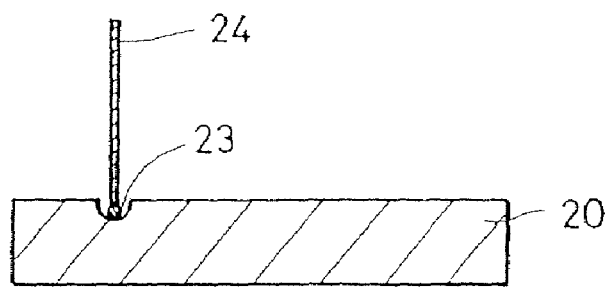

The surface of the resultant support was observed with an FE-SEM. A carbon nanotube had grown from the catalytic super-fine particle 73 portion in the hole 72 as shown in FIG. 10D, having a diameter within a range of from several nm to several tens of nm.

For the purpose of evaluating properties of the resultant carbon nanotube device, the support was attached to the probe portion of the STM/AFM evaluating unit to form a probe connected to an electrode. As a result of the STM/AFM evaluation, a satisfactory image based on a carbon nanotube tip was obtained. This is considered to be due to a good directivity of the carbon nanotube surrounded by the wall, sufficient electrical connection between the carbon nanotube and the electrode (the low-resistance Si in this example), and the sharp tip thereof.

EXAMPLE 5

A typical configuration of a tunnel type carbon nanotube device will now be described with reference to the schematic diagrams shown in FIGS. 11A and 11B.

Figure 11A:
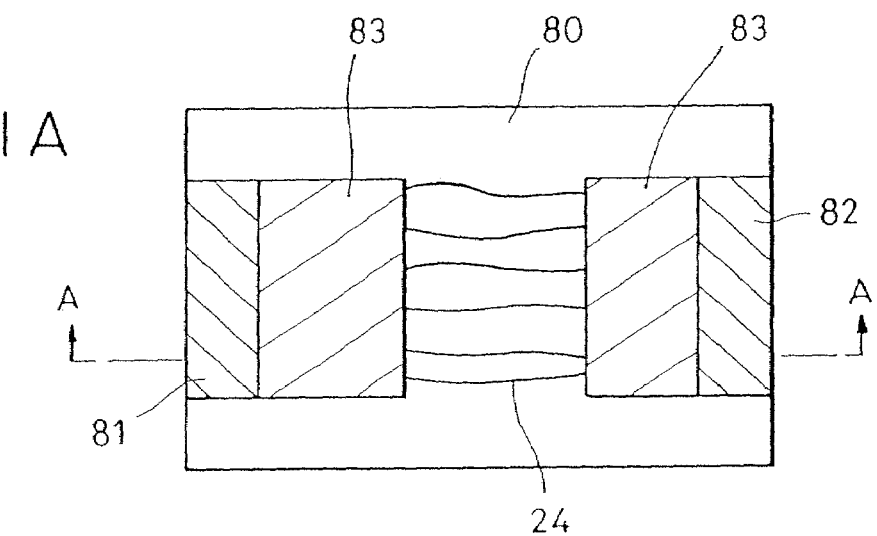
FIG. 11A is a schematic plan view of an embodiment of the tunnel type carbon nanotube device.
Figure 11B:
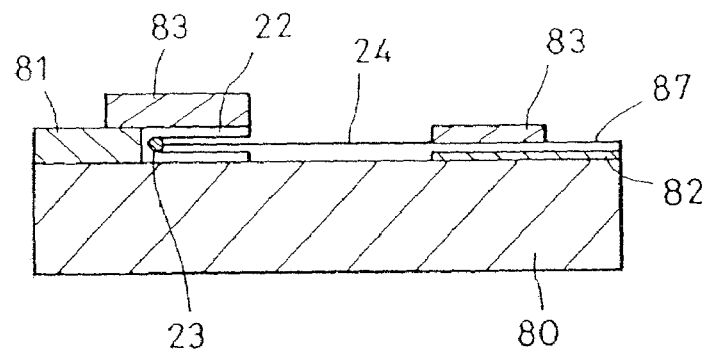
FIG. 11B is a sectional view of the tunnel type carbon nanotube device shown in FIG. 11A cut along the line A-A.

First, an alumina film 22 provided with electrodes 81 and 82 and a fine hole adjacent to the electrode 81 was formed as shown in FIG. 11A on a high-resistance or an insulating support 80.

A catalytic super-fine particle was introduced into the narrow hole. A carbon nanotube 24 had grown from the surface of the catalytic super-fine particle and reached the top of the electrode 82. A thin insulating layer was provided on a part of the electrode 82, and was connected to the carbon nanotube 24 thereabove via the insulating layer 87. An insulating coat film was provided over the insulating layer 87 and a wall 86. The electrode 81 and the carbon nanotube were isolated from each other by the wall. The electrodes 81 and 82 were connected in the sequence of the electrode 81—the wall alumina layer 22—the catalytic super-fine particle 23—the carbon nanotube 24—the insulating layer 87—the electrode 82.

Current-voltage property of the resultant device having the aforementioned configuration was evaluated after connection of the electrodes by inserting it into liquid helium and cooling it to 4 K. A negative-resistance area was observed as a result in the current-voltage property. This is considered to be a result of a resonance tunnel effect because the device of the invention has double barriers. By the utilization of this phenomenon, the device of the invention is expected to be applied for high-frequency detection and oscillation.

When manufacturing carbon nanotubes by the pyrolysis process by simply seeding catalytic super-fine particles at a high density on a flat surface, there is a high probability that a single carbon nanotube grows while causing connection of many catalytic super-fine particles in and outside. More specifically, directivity of a carbon nanotube connecting a plurality of catalytic super-fine particles as above is not uniform and the geometry including diameter cannot be uniform in many cases. It is therefore desirable to cause individually isolated catalytic super-fine particles to grow.

While a carbon nanotube is often applied as an electrode, it is the general practice on the present level of art, after synthesis of the carbon nanotubes, to attach the carbon nanotubes to the substrate by conducting paste scatter them onto the substrate and form a metal film on them.

The carbon nanotube device of the invention has a feature in that it has a configuration in which the carbon nanotube conductively binds to the conductive surface without the need to conduct such electrode attachment after synthesis. The device having such a configuration can be prepared by selecting an optimum combination of a composition and a shape of the conductive surface, the catalytic super-fine particle, and the barrier isolating the super-fine particles, and a synthesizing method of carbon nanotube as described in this specification. According to the present invention, there are available, for example, the following advantages:

(1) There is available a satisfactory device electrically connected to electrodes and in which carbon nanotube are isolated from each other.

(2) An electron emitting device excellent in electron emitting property can be obtained.

(3) There is available a probe such as an STM or an AFM giving a satisfactory image and having a high strength.

(4) A novel tunnel type device using carbon nanotube is available.

(5) The carbon nanotube device of the invention has a configuration in which the conductive surface comprises a layer containing Ti, Zr, Nb, Ta, Mo, Cu or Zn, or particularly a layer containing Nb, and an Al anodic oxidation film, i.e., an alumina film having a fine hole is provided on the surface film of the conductive surface. In this configuration, the alumina film and the conductive surface show a satisfactory adherence, so that the alumina film never peels off the conductive surface at the interface. This configuration is therefore favorable for carbon nanotube applicable for a high-quality electron emitting device or a probe for STM or AFM (6) When a semiconductor such as a p-type Si is used as a support, it is possible to easily form a plurality of narrow holes isolated by a wall of Si or Si oxide on the surface of the p-type Si by anodizing the surface of the p-type Si. By causing carbon nanotubes to grow from these narrow holes, the growing direction of the carbon nanotube is regulated by the wall. It is therefore possible to form a carbon nanotube device having carbon nanotubes having substantially a uniform directivity at a low cost.

(7) When connecting the conductive surface and the carbon nanotubes to electrodes via the catalytic super-fine particles, it is desirable for growth control of carbon nanotubes to select one or more metals from Fe, Co and Ni for the catalytic super-fine particles.

(8) The carbon nanotube device in which the carbon nanotubes and the conductive surface are in an electrical tunnel junction is preferable when manufacturing a resonance tunnel device or the like.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An electronic device comprising:
   (i) a plurality of carbon nanotubes provided on a surface of a substrate, each of the carbon nanotubes having a first end portion and a second end portion; and
   (ii) a first conductive member and a second conductive member,
   wherein the first end portion of each of the carbon nanotubes is positioned between a part of the first conductive member and the surface of the substrate and is electrically connected to the first conductive member,
   wherein the second end portion of each of the carbon nanotubes is positioned between a part of the second conductive member and the surface of the substrate and is electrically connected to the second conductive member,
   wherein the second conductive member has a first conductive film and a second conductive film, and
   wherein the first conductive film is disposed between the second end portion of each of the carbon nanotubes and the surface of the substrate, and wherein the second end portion of each of the carbon nanotubes is disposed between the first conductive film and the second conductive film.

* * * * *